United States Patent
Chen et al.

(10) Patent No.: US 7,089,564 B2
(45) Date of Patent: Aug. 8, 2006

(54) HIGH-PERFORMANCE MEMORY QUEUE

(75) Inventors: Shawfu Chen, New Milford, CT (US); Robert O. Dryfoos, Hopewell Junction, NY (US); Allan Feldman, Poughkeepsie, NY (US); David Y. Hu, Poughkeepsie, NY (US); Jason A. Keenaghan, Wappingers Falls, NY (US); Peter G. Sutton, Lagrangeville, NY (US); Mei-Hui Wang, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/790,853

(22) Filed: Feb. 22, 2001

(65) Prior Publication Data

US 2002/0116538 A1   Aug. 22, 2002

(51) Int. Cl.
*G06F 9/46* (2006.01)
(52) U.S. Cl. .................. 719/314; 718/101; 718/104
(58) Field of Classification Search ............... 719/314; 718/101, 104; 707/103
See application file for complete search history.

(56) References Cited

U.S. PATENT DOCUMENTS

| 5,133,053 | A |   | 7/1992  | Johnson et al. ............ 395/200 |
|-----------|---|---|---------|------------------------------------|
| 5,465,328 | A | * | 11/1995 | Dievendorff et al. ......... 714/15 |
| 5,680,539 | A |   | 10/1997 | Jones .................... 395/182.04 |
| 5,907,673 | A |   | 5/1999  | Hirayama et al. ...... 395/182.14 |
| 5,916,307 | A | * | 6/1999  | Piskiel et al. .............. 719/314 |
| 6,078,944 | A |   | 6/2000  | Enko et al. ................ 709/105 |
| 6,578,033 | B1| * | 6/2003  | Singhal et al. ................ 707/8 |
| 6,609,178 | B1| * | 8/2003  | Ofer ......................... 711/152 |

* cited by examiner

*Primary Examiner*—William Thomson
*Assistant Examiner*—Andy Ho
(74) *Attorney, Agent, or Firm*—Eugene I. Shkurko, Esq.; Kevin P. Radigan, Esq.; Heslin Rothenberg Farley & Mesiti P.C.

(57) ABSTRACT

A highly available, high-performance memory queue. Locking of the queue is minimized in order to provide a highly available queue and to improve performance of the queue. Multiple updates of the queue can occur under a single lock. Further, messages of the queue are persistent. A time-initiated checkpointing process, as well as the storing of message information on a recovery log, ensures the persistence of the queue messages.

69 Claims, 8 Drawing Sheets

MQSERIES CHECKPOINT ROOT

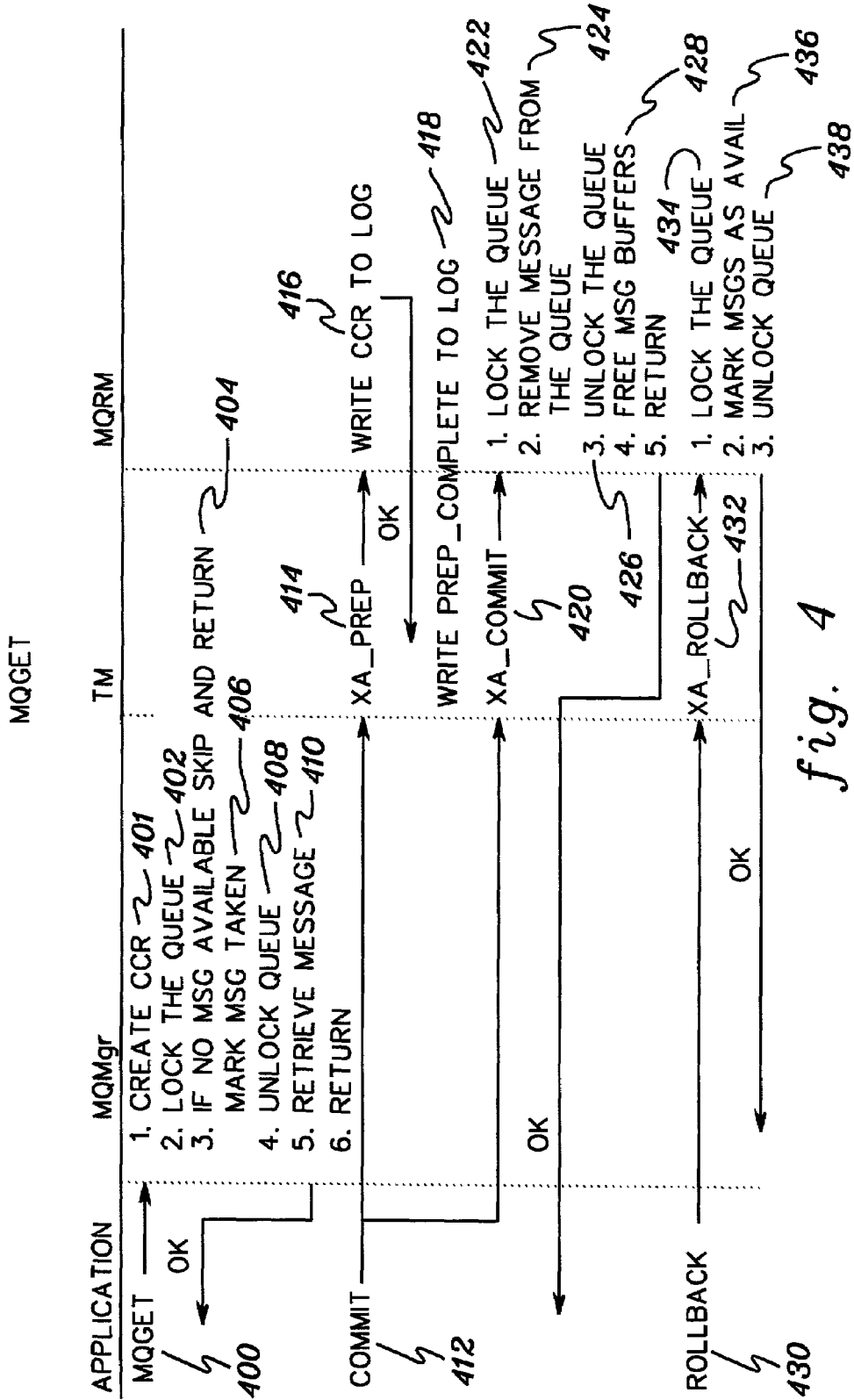

HIGH-PERFORMANCE MEMORY QUEUE

TECHNICAL FIELD

This invention relates, in general, to network messaging and queuing, and in particular, to providing and using a high-performance memory queue for messaging.

BACKGROUND ART

One technology that supports messaging and queuing across a network is referred to as MQSeries and is offered by International Business Machines Corporation. With MQSeries, users can dramatically reduce application development time by using MQSeries API functions. Since MQSeries supports many platforms, MQSeries applications can be ported easily from one platform to another. In a network, two MQSeries systems communicate with each other via channels, such as MQSeries channels. An MQSeries sender channel defines a connection from one MQSeries system to another MQSeries system and transmits messages from the one system to the other system.

Applications send messages to each other without providing complicated logic to handle error cases when messages are lost and without worrying about the communication method used to deliver the messages. In MQSeries, an application can declare a message as persistent and rely on MQSeries to deliver the message without worrying about losing it. The MQSeries solutions on the various platforms utilize some form of a file system to store the messages before they are successfully delivered to the destination MQSystem and acknowledged by the destination MQSystem. Using a file system to store messages, however, requires disk I/O operations, which are very expensive in terms of process cycles, and thus, very slow in terms of performance.

Another overhead associated with the file queue is related to the locking of the queue. When one application is performing a transaction that is to access the queue to either retrieve a message or add a message, the file queue is locked the entire transaction scope to prevent other processes from accessing the queue. This further decreases the queue performance, and makes it unusable by a high-performance application.

Some platforms today have improved the performance of the queue by using asynchronous file I/O operations, in addition to logging and checkpointing when updating the file queue. With this type of I/O operation, I/Os proceed without waiting their completion. This reduces the I/O time, and thus, increases file queue access. While the asynchronous I/O logging and checkpointing have increased file queue performance, the increase is not enough to satisfy high-performance applications that require the handling of thousands of persistent messages per second. Further, the I/O operations have not addressed the problem of minimizing locking overhead.

Thus, a need still exists for a high-performance queue. In particular, a need exists for a queue that is able to handle thousands of persistent messages per second. Further, a need exists for a queue in which locking is minimized.

SUMMARY OF THE INVENTION

The shortcomings of the prior art are overcome and additional advantages are provided through the provision of a method of managing queues. The method includes, for instance, issuing a transaction to access a queue resident in memory; and selectively locking the queue during processing of the transaction, wherein the queue remains unlocked for one or more aspects of the transaction processing.

In a further aspect of the present invention, a method of managing queues is provided. The method includes, for instance, requesting a plurality of updates to a queue in memory; and committing the plurality of updates to the queue under a single lock of the queue.

In yet a further aspect of the present invention, a method of managing queues is provided in which the method includes, for instance, issuing a first transaction to access a queue in memory, wherein one or more messages of the queue are persistent messages; issuing a second transaction to access the queue, wherein at least a part of processing of the second transaction is concurrent with at least a part of processing of the first transaction; and obtaining a lock of the queue, during an aspect of processing of the first transaction, to commit a plurality of updates to the queue under the lock. The queue remains unlocked for one or more other aspects of processing of the first transaction, and the second transaction is capable of locking the queue to perform one or more updates of the queue when the queue is unlocked.

Advantageously, a highly available, high-performance memory queue is provided. Locking of the queue is minimized in order to provide a highly available queue and to improve the performance of the queue. Multiple updates of the queue can occur under a single lock. Further, a plurality of transactions that are to access the queue can be concurrently processed, since locking of the queue is minimized.

Additionally, messages of the queue are persistent. A time-initiated checkpointing process, as well as the storing of message information on a recovery log, ensures the persistence of the queue messages.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 depicts one embodiment of the logic associated with retrieving a message from the local queue, in accordance with an aspect of the present invention;

BEST MODE FOR CARRYING OUT THE INVENTION

In accordance with an aspect of the present invention, a high-performance queue is provided and utilized for messaging. The queue is located in memory, and locking of the queue is controlled, such that the locking is minimal. This increases the performance of the queue.

Figure 1A:
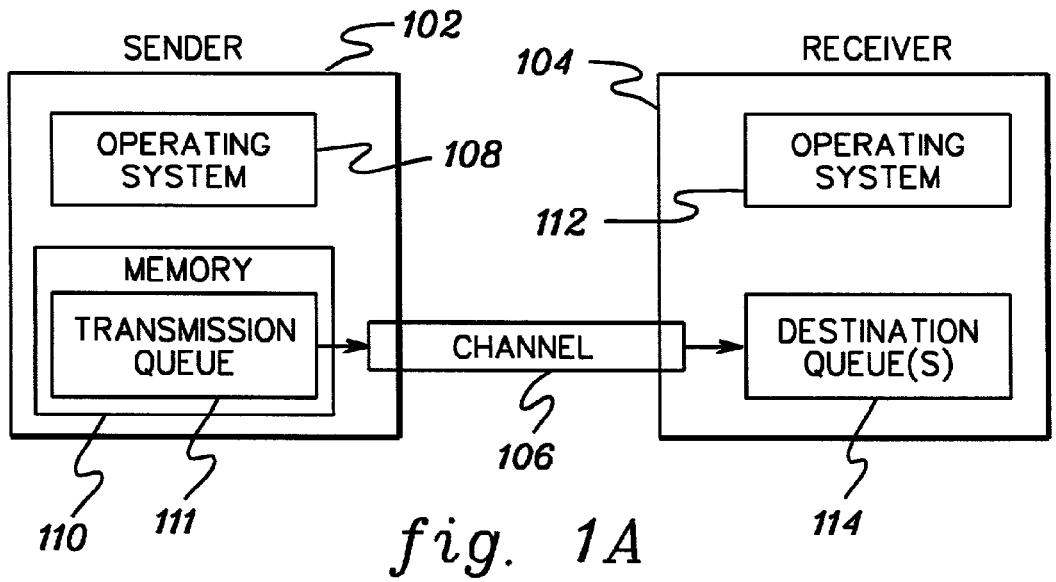
FIG. 1a depicts one embodiment of a communications environment incorporating and using one or more aspects of the present invention.

One embodiment of a communications environment incorporating such a queue is depicted in FIG. 1a. As shown in FIG. 1a, a communications environment 100 includes, for instance, a sender 102 coupled to a receiver 104 via one or more channels 106. In one example, sender 102 is a computing unit having an operating system 108, such as the TPF Operating System offered by International Business Machines Corporation, and a local memory 110. The local memory includes one or more queues 111 used for messaging. In one example, the one or more queues are transmission queues, which include messages to be transmitted to receiver 104.

Receiver 104 is also a computing unit, as one example. It includes an operating system 112, such as the TPF Operating System, and one or more destination queues 114 for receiving messages transmitted from sender 102.

In one embodiment, channel 106 is a sender channel, and is based, for instance, on MQSeries, offered by International Business Machines Corporation. MQSeries is described in a publication entitled, *MQSeries Intercommunication,* IBM Publication No. SC33-1872-03 (March 2000), which is hereby incorporated herein by reference in its entirety.

Figure 1B:
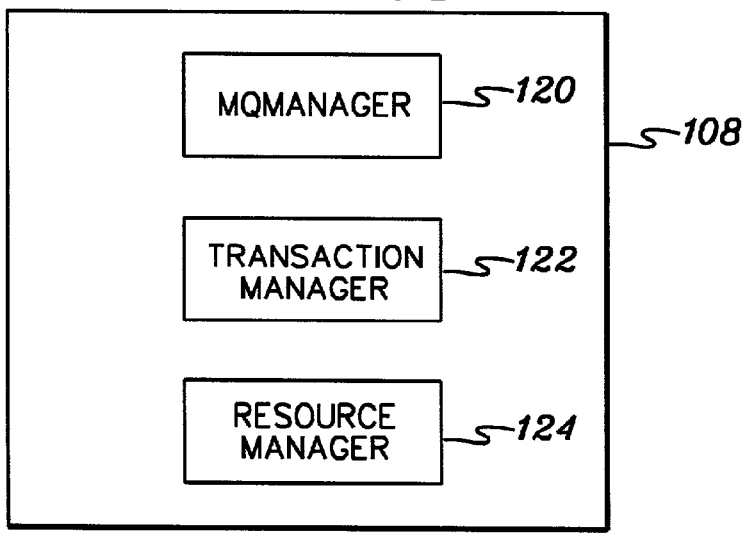
FIG. 1b depicts one example of various components of an operating system of FIG. 1a, in accordance with an aspect of the present invention.

Further details regarding operating system 108 are described with reference to FIG. 1b. Operating system 108 includes various components used to control aspects of messaging. In one example, these components include an MQManager 120 used in managing the placing of messages on the queue and the retrieving of messages from the queue; a transaction manager (TM) 122 used in controlling the initiation of commit and/or rollback operations; and a resource manager 124 used in controlling the locking of the queue during commit processing.

Figure 2:
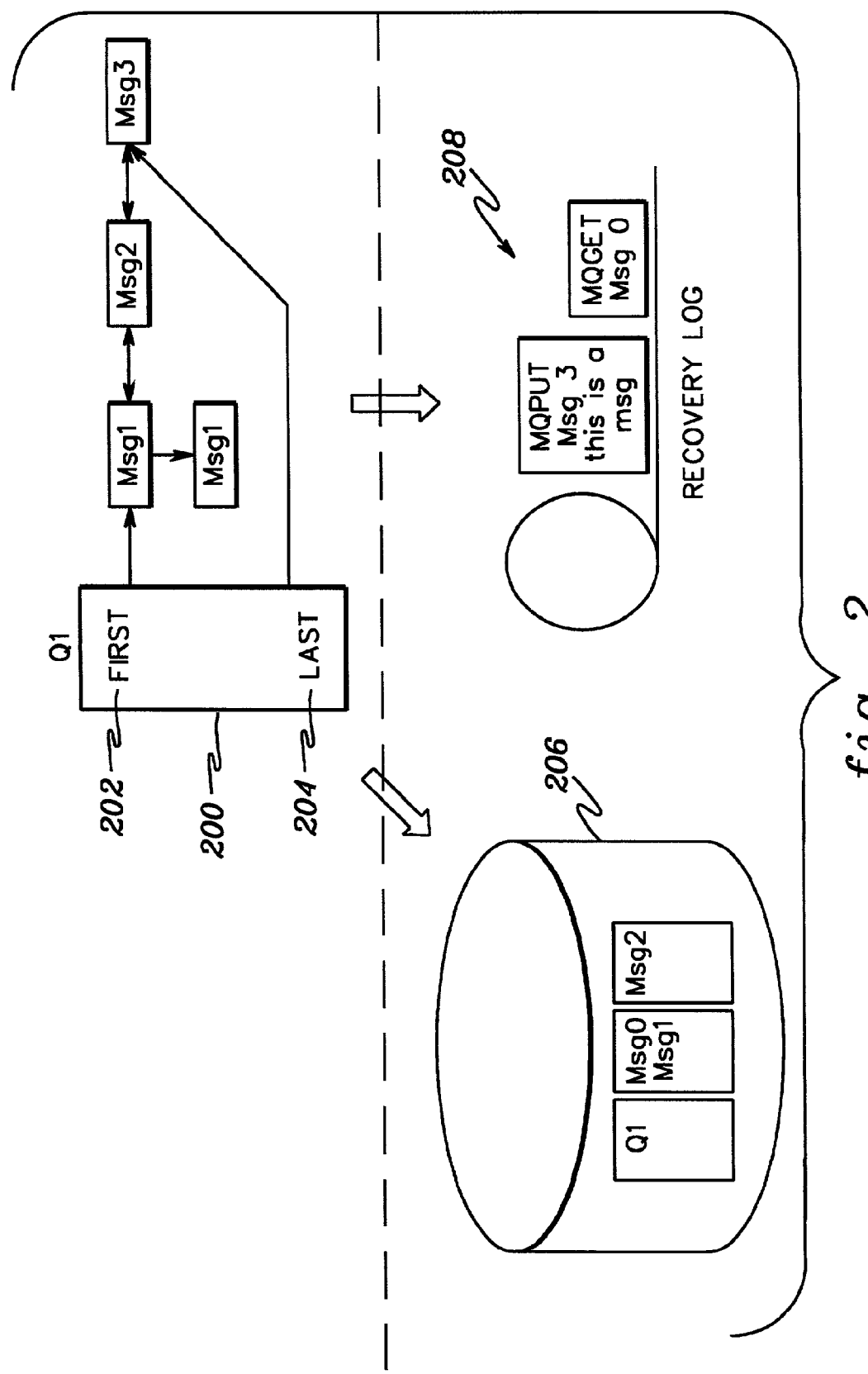
FIG. 2 depicts one embodiment of a local queue and associated checkpoint and recovery log, in accordance with an aspect with the present invention.

In one example, a queue 200 (FIG. 2) can have one or more messages associated therewith. In particular, the queue includes a first pointer 202 to the first message of a chain of one or more messages of the queue, and a last pointer 204 to the last message of the chain. The content of each message is included in one or more system work blocks (SWB), each of is 1,024 bytes in length, as one example.

The definition of the queue and the contents of the queue are written to a checkpoint 206 at predefined time intervals, as described further below. Additionally, between checkpoints, updates are written to a recovery log 208.

Figure 3A:
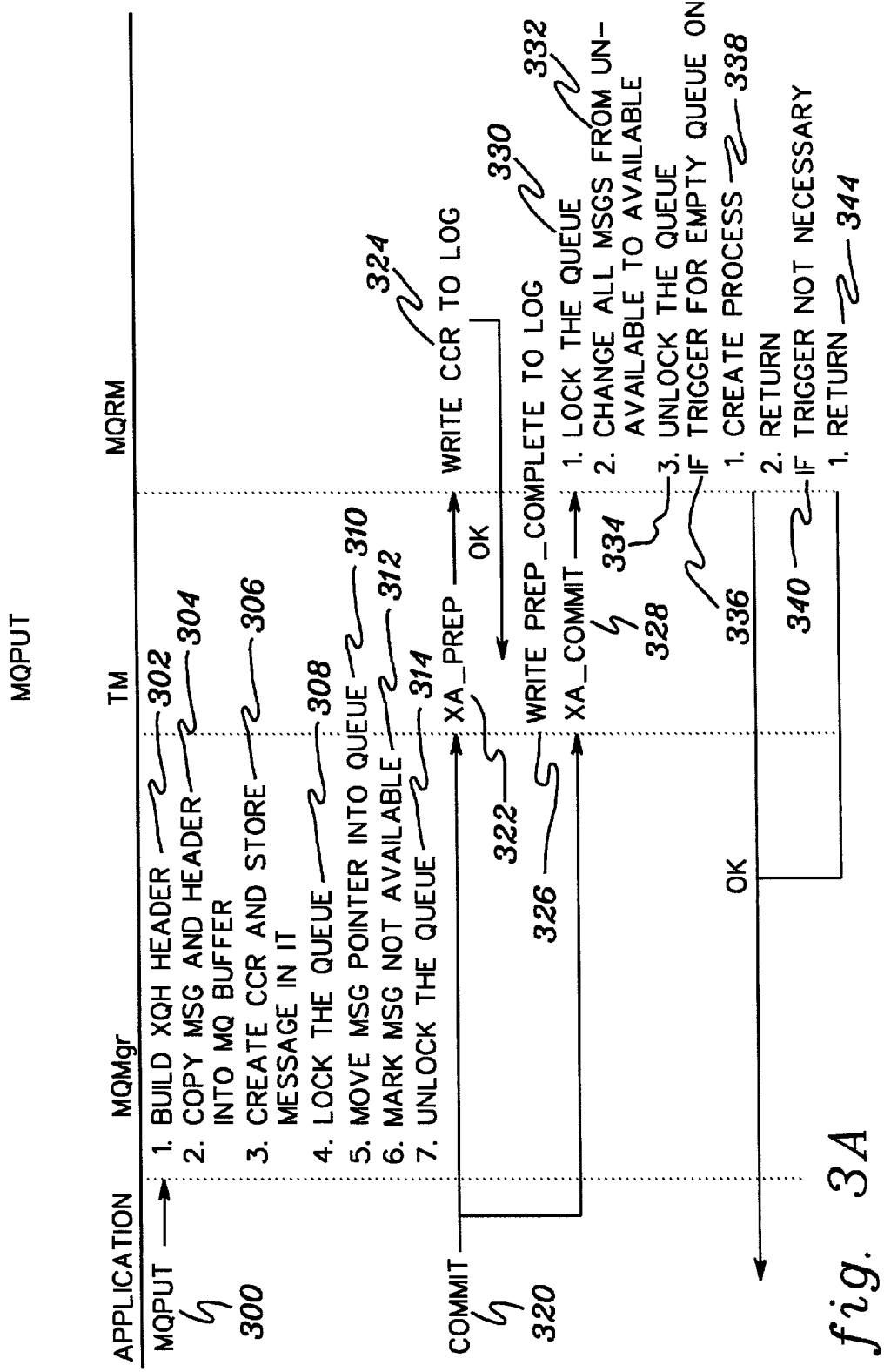
FIGS. 3a–3b depict one embodiment of the logic associated with an application writing a message to a local queue, in accordance with an aspect of the present invention.
Figure 3B:
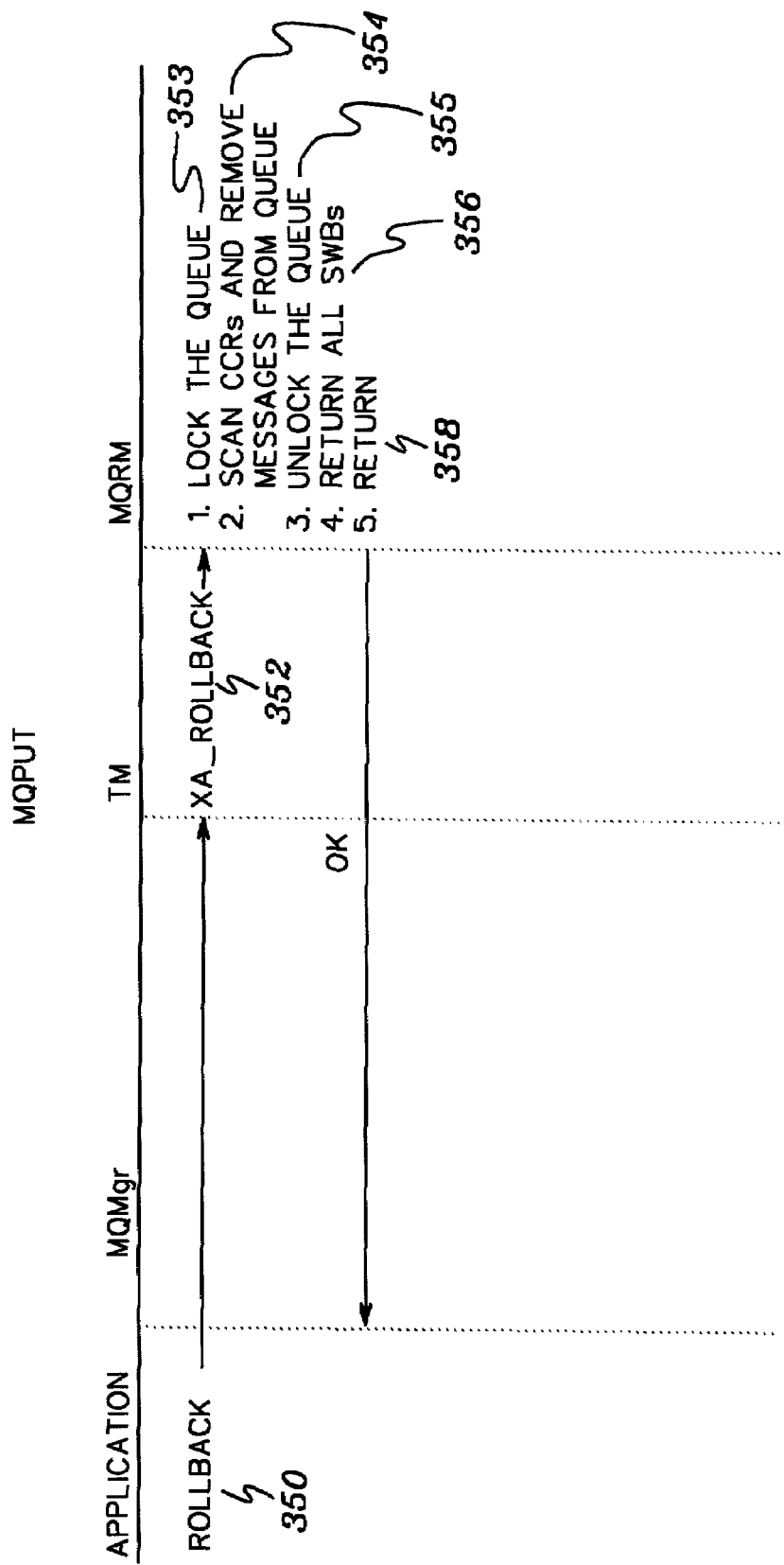

One embodiment of the logic associated with placing a message on a memory queue, in accordance with an aspect of the present invention, is described with reference to FIGS. 3a-3b. Referring to FIG. 3a, initially, an application issues an MQPUT operation 300 indicating that it wishes to add a message to a local memory queue. The MQPUT operation is forwarded to the MQManager, which performs various actions associated with placing the message on the queue. For example, the MQManager builds a transmission queue header (XQH) to identify the destination of the message, STEP 302. Thereafter, the message and the header are copied to an MQ buffer located in local memory, STEP 304. Subsequently, a commit control record is created and the message, which includes a unique message id, is written to the record, along with an indication that this is an MQPUT operation, STEP 306.

The queue is then locked, STEP 308, in order to move the message pointer into the queue, STEP 310, and to mark the message as not available, STEP 312. The queue is then unlocked, STEP 314. Thus, in this example, the queue is only locked for a couple of instructions.

When the application is ready to commit the changes to the queue, the application issues a commit operation, STEP 320. The commit is forwarded to the transaction manager, which is responsible for controlling the commit process.

Initially, the transaction manager issues a prepare instruction, STEP 322, which instructs the resource manager to write the commit control record to the recovery log, STEP 324. After the transaction manager receives an indication that the commit record has been written to the log, the transaction manager then writes a preparation complete message to the log, STEP 326. Thereafter, the commit can take place.

In order to perform the commit, the transaction manager issues a commit instruction, STEP 328. This commit instruction is forwarded to the resource manager, which is responsible for handling the commit.

Initially, the resource manager locks the queue, STEP 330, and then changes the status of the messages in the queue from unavailable to available, STEP 332. Thereafter, the queue is unlocked, STEP 334. Thus, again, the queue is locked for only a short period of time.

Subsequently, if a trigger is set on for an empty queue, STEP 336, then a process is created indicating that the queue is not empty any longer, STEP 338. This wakes up an application to retrieve the message from the queue. However, if the trigger is not desired or necessary, STEP 340, then processing returns, STEP 344. This completes the commit process.

An application may decide to rollback the changes committed to the queue. If so, the application issues a rollback instruction, STEP 350 (FIG. 3b). When the rollback instruction is received by the transaction manager, the transaction manager initiates the rollback procedure by informing the resource manager to perform the rollback, STEP 352.

In order to rollback, the resource manager locks the queue, STEP 353, and then, scans the commit control records and removes any messages from the queue, STEP 354. Thereafter, the queue is unlocked, STEP 355, and system work blocks are returned to memory, STEP 356. This completes the rollback processing, STEP 358.

In addition to placing messages on the queue, an application may retrieve one or more messages from the queue. In order to retrieve messages from the queue, an MQGET operation is issued by an application, STEP 400. When an application issues an MQGET, the MQManager performs various functions. For example, a commit control record is created and stored therein is the unique message id and an indication that it is an MQGET, STEP 401. Thereafter, the MQManager locks the queue, STEP 402, and attempts to locate the message. If the message is not available, then the queue is unlocked and processing ends, STEP 404. However, if there is a message, the requested message is marked as taken, STEP 406, and then, the queue is unlocked, STEP 408. Thereafter, the message is retrieved, STEP 410.

After the application receives an indication that the message has been successfully retrieved, the application can commit the changes to the queue. The application issues a commit instruction, STEP 412, which is received by the transaction manager. The transaction manager then prepares for the commit, STEP 414.

When the resource manager receives the prepare commit indication, it writes the commit control record to the recovery log, STEP 416. After successful completion of the logging, the transaction manager writes a preparation complete message to the log, STEP 418. Thereafter, the commit takes place, STEP 420.

In order to perform the commit, the resource manager locks the queue, STEP 422, and removes the message from the queue, STEP 424. Subsequently, the queue is unlocked, STEP 426, and the message buffers are freed, STEP 428.

If the application determines that the commit should be rolled back, then a rollback instruction is issued, STEP 430. The transaction manager receives the rollback instruction, and notifies the resource manager of the rollback, STEP 432. Then, the resource manager locks the queue, STEP 434, and marks the messages as available, STEP 436. Thereafter the queue is unlocked, STEP 438. This completes the rollback processing for an MQGET instruction.

Described in detail above is a procedure for placing messages on a queue resident in memory and for retrieving messages from the queue. Since the queue is local in memory, and since message persistence is to be provided, steps are taken to ensure the persistence. In particular, checkpointing is used, in addition to the recovery log already described above.

Figure 5:
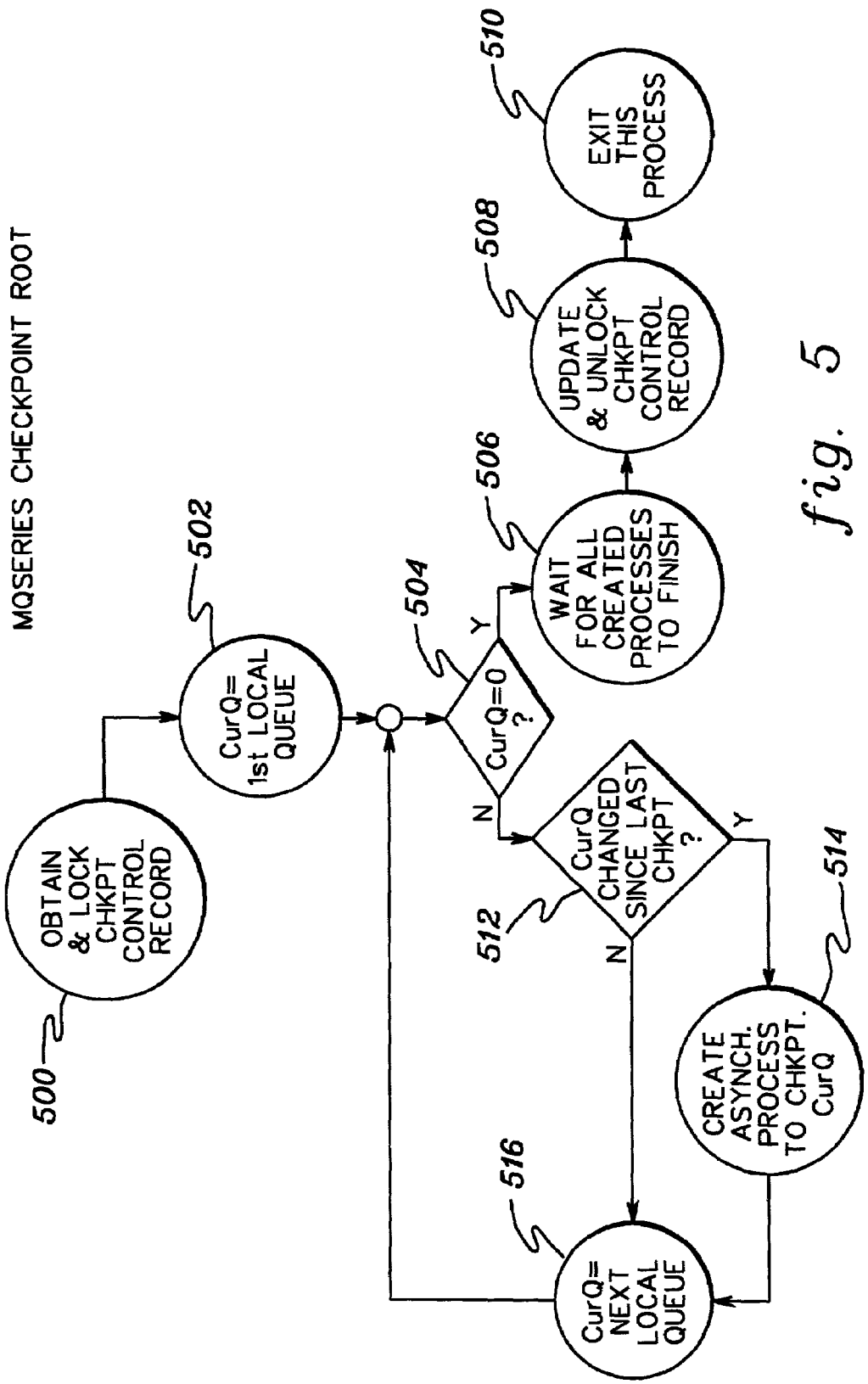
FIG. 5 depicts one embodiment of the logic associated with initiating a checkpoint at predefined intervals, in accordance with an aspect of the present invention.

In order to provide persistence of the messages on the queue, a checkpoint process is initiated at predefined intervals (e.g., every 5 seconds). One embodiment of the logic associated with initiating a checkpoint process is described with reference to FIG. 5.

Initially, a checkpoint control record is obtained and locked, STEP 500. Thereafter, a variable referred to as current queue (CurQ) is set equal to the first local queue, STEP 502. Then, a determination is made as to whether the current queue is equal to zero, INQUIRY 504. If the current queue is equal to zero, then the logic waits for the created processes (e.g., the asynchronous checkpoint processes) to finish, STEP 506. Subsequently, the checkpoint control record is updated to indicate checkpointing is complete and the record is unlocked, STEP 508. This concludes the processing of the checkpoint initiation, STEP 510.

Returning to Inquiry 504, if the current queue is not zero, then a further determination is made as to whether the current queue has changed since the last checkpoint, STEP 512. If the current queue has changed, then an asynchronous process is created to checkpoint the current queue, STEP 514, as described below. Thereafter, or if the current queue has not changed since the last checkpoint, then the variable, current queue, is set equal to the next local queue, STEP 516. Processing then continues with INQUIRY 504.

Figure 6:
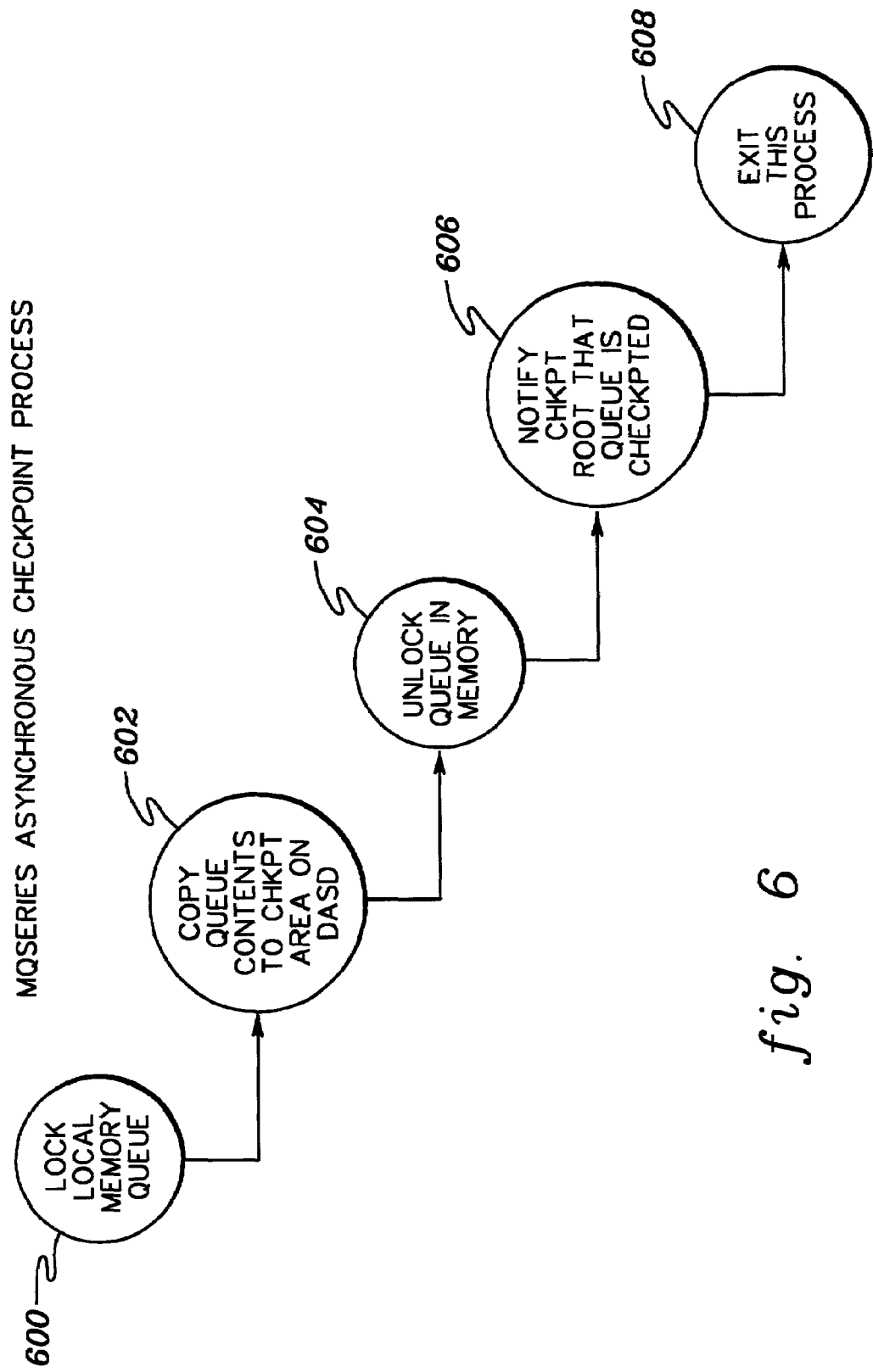
FIG. 6 depicts one embodiment of the logic associated with an asynchronous checkpoint process, in accordance with an aspect of the present invention.

One embodiment of the logic associated with the asynchronous process to checkpoint the current queue is described with reference to FIG. 6. Initially, the local memory queue is locked, STEP 600, and then, the queue contents are copied to a checkpoint area resident on a storage medium, such as DASD, STEP 602. Thereafter, the queue is unlocked, STEP 604, and the checkpoint root process (FIG. 5) is notified that the queue is checkpointed, STEP 606. This concludes the checkpoint process, STEP 608.

As described in detail above, a high-performance memory queue is provided, which ensures message persistence. The memory queue is locked when updates to the queue are desired, and otherwise, the queue remains available. That is, during the scope of a transaction, which includes processing for one or more MQPUT and/or MQGET operations, the queue remains available (unlocked) for various aspects of the transaction processing.

Figure 7:
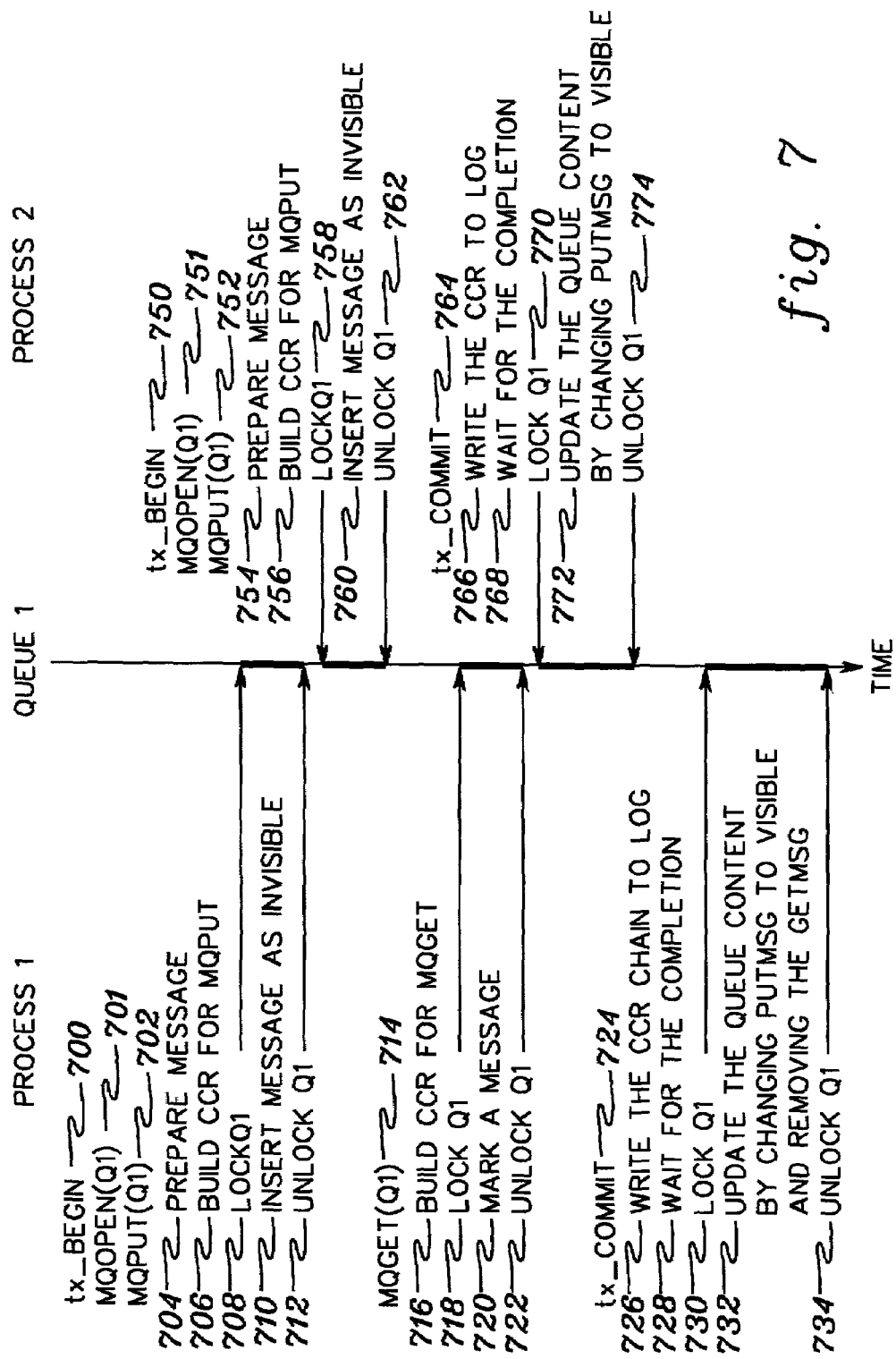
FIG. 7 depicts one embodiment of the logic associated with concurrent processing of the queue, in accordance with an aspect of the present invention.

In a further aspect of the present invention, a plurality of operations (e.g., a plurality of MQPUT and/or MQGET operations) can be issued within the same transaction scope, and updates to the queue effected by the multiple operations can be committed to the queue under a single lock. In particular, the resource manager can lock the queue and then update the queue for the multiple operations. Thereafter, the queue is unlocked. Further, since locking of the queue is minimized, multiple processes can concurrently access the queue. One embodiment of this concurrent processing is described in further detail with reference to FIG. 7.

Initially, Process 1 begins a transaction, STEP 700. During the scope of the transaction, Process 1 issues an MQOPEN operation to locate the desired memory queue, STEP 701. Thereafter, it issues an MQPUT operation for Queue 1, STEP 702. When the MQManager receives the MQPUT operation, it prepares the message, STEP 704. As described above, this preparation includes building the transmission queue header and copying the message and header into the MQ buffer. Additionally, the MQManager builds the commit control record for the MQPUT, STEP 706, and stores the message in that commit control record.

Subsequently, the queue is locked, STEP 708, and the status of the message is changed to not available, STEP 710. Further, the message pointer is moved into the queue, and the queue is unlocked, STEP 712. As can be seen, the queue is locked for only a short duration.

Additionally, Process 1 issues an MQGET operation for Queue 1, STEP 714. When the queue manager receives the MQGET operation, it builds a commit control record for the MQGET, STEP 716. Thereafter, it locks the queue, STEP 718, and marks the message as taken, STEP 720. Thereafter, the queue is unlocked, STEP 722.

Subsequently, the process issues a transaction commit operation, STEP 724. As part of the commit, the transaction manager writes the commit control record (CCR) chain (i.e., the CCR for both the MQPUT and MQGET) to a log, STEP 726, and waits for completion of the logging, STEP 728. When the writing of the commit control record chain to the log is complete, the resource manager locks the queue, STEP 730. At this point, multiple updates to the queue are performed during the single lock. For example, the queue content is updated by changing the PUT message to visible and by removing the GET message, STEP 732. Thereafter, the queue is unlocked, STEP 734.

Concurrent with the transaction processing of Process 1, Process 2 also begins a transaction, STEP 750. As part of the transaction scope, Process 2 also issues an MQOPEN operation to locate Queue 1, STEP 751. Thereafter, it issues an MQPUT operation for Queue 1, STEP 752. The MQManager prepares the message, STEP 754, and builds the CCR for the MQPUT, STEP 756, as described above. Further, the queue is locked, STEP 758. While the queue is locked, the status of the message is changed to unavailable, STEP 760, and then the queue is unlocked, STEP 762.

Thereafter, Process 2 issues a commit operation, STEP 764. During the commit processing, the CCR is written to the log, STEP 766. When the writing of the CCR to the log is complete, STEP 768, the resource manager locks the queue, STEP 770. While the queue is locked, the queue content is updated by changing the PUT message to visible, STEP 772. Then, the queue is unlocked, STEP 774.

As described above, Process 2 can concurrently access Queue 1, since the queue is only locked periodically and only for a short duration (e.g., one or two instructions) each time. The queue remains available during various aspects of transaction processing. Thus, the queue is not locked for the entire transaction scope.

Advantageously, an aspect of the present invention provides for a highly available, high-performance queue by placing the queue in memory (and thus eliminating file I/O access) and by minimizing the locking of the queue. The queue need not be locked for the entire transaction processing, but instead, is locked when an update of the queue is needed or desired. The locking of the queue is brief (typically for one or two operations), and therefore, queue contention is minimized. Further, the queue is highly available, since multiple updates to the queue can be committed under a single lock. Thus, in accordance with an aspect of the present invention, a highly accessible queue is provided, having very high performance. For example, the queue can handle thousands of messages per second.

In a further aspect of the present invention, the messages are persistent. In order to ensure this persistence, time-initiated checkpointing of the memory-resident queues is performed, as well as the storing of information regarding the messages to a system's transaction recovery log.

Although in the example above, the queue is referred to as a transmission queue. This is only one example. The invention is equally applicable to other queues.

The communications environment described above is only one example. For instance, although the operating system is described as TPF, this is only one example. Various other operating systems can be used. Further, the operating systems in the different computing environments can be heterogeneous. The invention works with different platforms. Additionally, the invention is usable by other types of environments.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing message queues, said method comprising:

issuing a transaction to access a queue containing messages resident in volatile memory;

selectively locking the queue during processing of said transaction, wherein the queue remains unlocked for one or more aspects of the transaction processing; and maintaining persistence of one or more messages of said queue, said maintaining persistence comprising performing a checkpoint of said queue at predefined time intervals, said performing the checkpoint comprising copying a definition of said queue and contents of said queue, including said one or more messages, to persistent storage;

between time interval based checkpoints comprising copying said definition of said queue and said contents of said queue, writing information regarding an update of the one or more messages of the queue to a log in persistent storage; and wherein the performing of the checkpoint of the queue further comprises:

(i) obtaining and locking a checkpoint control record;

(ii) setting a variable "current queue" equal to a local queue;

(iii) determining whether the "current queue" is equal to zero;

(iv) if the "current queue" is equal to zero, then waiting for created processes to finish, and thereafter updating the checkpoint control record to indicate checkpointing is complete, and unlocking the record;

(v) if the "current queue" is not zero, then determining whether the local queue has changed since the last checkpoint;

(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

2. The method of claim 1, wherein the selectively locking comprises locking the queue to update the queue.

3. The method of claim 2, further comprising unlocking the queue substantially immediately after the update.

4. The method of claim 2, wherein the update comprises changing a status of one or more messages of the queue.

5. The method of claim 4, wherein the status is changed from unavailable to available.

6. The method of claim 2, wherein the update comprises removing a message from the queue.

7. The method of claim 2, wherein the transaction includes a request to place a message on the queue, and wherein the update comprises placing a pointer to the message on the queue.

8. The method of claim 7, wherein the update further comprises marking the message as unavailable.

9. The method of claim 2, wherein the transaction includes a request to retrieve a message from the queue, and wherein the update comprises marking the message as taken.

10. The method of claim 1, wherein the transaction includes a request to retrieve a message from the queue, and the selectively locking comprises:

one lock of the queue to mark the message as taken; and
another lock of the queue to remove the message from the queue.

11. The method of claim 1, wherein the transaction includes a request to place a message on the queue, and the selectively locking comprises:
   one lock of the queue to include a pointer to the message on the queue and to mark the message as unavailable; and
   another lock of the queue to change the message from unavailable to available.

12. The method of claim 1, wherein the transaction comprises a plurality of requests to update the queue, and wherein a plurality of updates are committed to the queue under a single lock obtained by the selectively locking.

13. The method of claim 12, wherein the committing of the plurality of updates is controlled by a resource manager.

14. The method of claim 1, further comprising concurrently processing a plurality of transactions that are to access the queue.

15. The method of claim 1, further comprising processing another transaction that is to access the queue concurrently with the processing of the transaction, wherein the another transaction is able to lock the queue to update the queue when the queue is unlocked during the concurrent processing of the transaction.

16. A method of managing message queues, said method comprising:
   requesting as part of a transaction a plurality of updates to a queue containing messages in volatile memory;
   committing the plurality of updates to the queue under a single lock of the queue, wherein the queue remains unlocked for one or more aspects of processing the transaction;
   maintaining persistence of one or more messages of the queue, the maintaining persistence comprising performing a checkpoint of said queue at predefined time intervals, said performing the checkpoint comprising copying a definition of said queue and contents of said queue, including said one or more messages, to persistent storage, and between time interval based checkpoints comprising copying said definition of said queue and said contents of said queue, storing information regarding an update of the one or more messages in at least one of a log and one or more checkpoint records; and
   wherein the performing of the checkpoint of the queue further comprises:
      (i) obtaining and locking a checkpoint control record;
      (ii) setting a variable "current queue" equal to a local queue;
      (iii) determining whether the "current queue" is equal to zero;
      (iv) if the "current queue" is equal to zero, then waiting for created processes to finish, and thereafter updating the checkpoint control record to indicate checkpointing is complete, and unlocking the record;
      (iv) if the "current queue" is not zero, then determining whether the local queue has changed since the last checkpoint;
      (vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

17. The method of claim 16, further comprising obtaining said single lock.

18. The method of claim 17, wherein said obtaining and said committing are controlled by a resource manager.

19. The method of claim 16, wherein said requesting comprises issuing at least one of one or more requests to place a message on the queue and one or more requests to retrieve a message from the queue, and wherein the committing comprises at least one of changing a status of one or more PUT messages and removing one or more GET messages.

20. The method of claim 16, further comprising concurrently processing a plurality of transactions that are to access the queue, wherein one transaction of said plurality of transactions includes the requesting.

21. A method of managing message queues, said method comprising:
   issuing a first transaction to access a queue containing messages in volatile memory, wherein one or more messages of said queue are persistent messages;
   issuing a second transaction to access the queue, wherein at least a part of processing of the second transaction is concurrent with at least a part of processing of the first transaction;
   obtaining a lock of the queue, during an aspect of processing of said first transaction, to commit a plurality of updates to the queue under the lock, wherein the queue remains unlocked for one or more other aspects of processing of the first transaction, and wherein said second transaction is capable of locking the queue to perform one or more updates of the queue when the queue is unlocked during processing of the first transaction; and
   maintaining persistence of the persistent messages of said queue, said maintaining persistence comprising
      performing a checkpoint of said queue at predefined time intervals, said performing the checkpoint comprising copying a definition of said queue and contents of said queue, including said one or more messages, to persistent storage;
      between time interval based checkpoints comprising copying said definition of said queue and said contents of said queue, writing information regarding an update of the persistent messages of the queue to a log in persistent storage; and
      wherein the performing of the checkpoint of the queue further comprises:
         (i) obtaining and locking a checkpoint control record;
         (ii) setting a variable "current queue" equal to a local queue;
         (iii) determining whether the "current queue" is equal to zero;
         (iv) if the "current queue" is equal to zero, then waiting for created processes to finish, and thereafter updating the checkpoint control record to indicate checkpointing is complete, and unlocking the record;
         (v) if the "current queue" is not zero, then determining whether the local queue has changed since the last checkpoint;
         (vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

22. A system of managing message queues, said system comprising:
- means for issuing a transaction to access a queue containing messages resident in volatile memory;
- means for selectively locking the queue during processing of said transaction, wherein the queue remains unlocked for one or more aspects of the transaction processing; and
- means for maintaining persistence of one or more messages of said queue, said means for maintaining persistence comprising
  - means for performing a checkpoint of said queue at predefined time intervals, said means for performing comprising means for copying a definition of said queue and contents of said queue, including said one or more messages, to persistent storage;
  - means for writing information, between time interval based checkpoints comprising copying said definition of said queue and said contents of said queue, regarding an update of the one or more messages of the queue to a log in persistent storage; and
  - wherein the means for performing the checkpointing of the queue further comprises means for:
    - (i) obtaining and locking a checkpoint control record;
    - (ii) setting a variable "current queue" equal to a local queue;
    - (iii) determining whether the "current queue" is equal to zero;
    - (iv) if the "current queue" is equal to zero, then waiting for created processes to finish, and thereafter updating the checkpoint control record to indicate checkpointing is complete, and unlocking the record;
    - (v) if the "current queue" is not zero, then determining whether the local queue has changed since the last checkpoint;
    - (vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

23. The system of claim 22, wherein the means for selectively locking comprises means for locking the queue to update the queue.

24. The system of claim 23, further comprising means for unlocking the queue substantially immediately after the update.

25. The system of claim 23, wherein the update comprises means for changing a status of one or more messages of the queue.

26. The system of claim 25, wherein the status is changed from unavailable to available.

27. The system of claim 23, wherein the update comprises means for removing a message from the queue.

28. The system of claim 23, wherein the transaction includes a request to place a message on the queue, and wherein the update comprises means for placing a pointer to the message on the queue.

29. The system of claim 28, wherein the update further comprises means for marking the message as unavailable.

30. The system of claim 23, wherein the transaction includes a request to retrieve a message from the queue, and wherein the update comprises means for marking the message as taken.

31. The system of claim 22, wherein the transaction includes a request to retrieve a message from the queue, and the means for selectively locking comprises:
- one lock of the queue to mark the message as taken; and
- another lock of the queue to remove the message from the queue.

32. The system of claim 22, wherein the transaction includes a request to place a message on the queue, and the means for selectively locking comprises:
- one lock of the queue to include a pointer to the message on the queue and to mark the message as unavailable; and
- another lock of the queue to change the message from unavailable to available.

33. The system of claim 22, wherein the transaction comprises a plurality of requests to update the queue, and wherein a plurality of updates are committed to the queue under a single lock obtained by the means for selectively locking.

34. The system of claim 33, wherein the committing of the plurality of updates is controlled by a resource manager.

35. The system of claim 22, further comprising means for concurrently processing a plurality of transactions that are to access the queue.

36. The system of claim 22, further comprising means for processing another transaction that is to access the queue concurrently with the processing of the transaction, wherein the another transaction is able to lock the queue to update the queue when the queue is unlocked during the concurrent processing of the transaction.

37. A system of managing message queues, said system comprising:
- means for requesting as part of a transaction a plurality of updates to a queue containing messages in volatile memory;
- means for committing the plurality of updates to the queue under a single lock of the queue wherein the queue remains unlocked for one or more aspects of processing the transaction;
- means for maintaining persistence of one or more messages of the queue, the means for maintaining persistence comprising means for performing a checkpoint of said queue at predefined time intervals, said means for performing comprising means for copying a definition of said queue and contents of said queue, including said one or more messages, to persistent storage, and means for storing information, between time interval based checkpoints comprising copying said definition of said queue and said contents of said queue, regarding an update of the one or more messages in at least one of a log and one or more checkpoint records; and
- wherein the means for performing the checkpointing of the queue further comprises means for:
  - (i) obtaining and locking a checkpoint control record;
  - (ii) setting a variable "current queue" equal to a local queue;
  - (iii) determining whether the "current queue" is equal to zero;
  - (iv) if the "current queue" is equal to zero, then waiting for created processes to finish, and thereafter updating the checkpoint control record to indicate checkpointing is complete, and unlocking the record;
  - (v) if the "current queue" is not zero, then determining whether the local queue has changed since the last checkpoint;
  - (vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

38. The system of claim 37, further comprising means for obtaining said single lock.

39. The system of claim 38, wherein said means for obtaining and said means for committing are controlled by a resource manager.

40. The system of claim 37, wherein said means for requesting comprises means for issuing at least one of one or more requests to place a message on the queue and one or more requests to retrieve a message from the queue, and wherein the means for committing comprises at least one of means for changing a status of one or more PUT messages and means for removing one or more GET messages.

41. The system of claim 37, further comprising means for concurrently processing a plurality of transactions that are to access the queue, wherein one transaction of said plurality of transactions includes the plurality of updates.

42. A system of managing message queues, said system comprising:
means for issuing a first transaction to access a queue containing messages in volatile memory, wherein one or more messages of said queue are persistent messages;
means for issuing a second transaction to access the queue, wherein at least a part of processing of the second transaction is concurrent with at least a part of processing of the first transaction;
means for obtaining a lock of the queue, during an aspect of processing of said first transaction, to commit a plurality of updates to the queue under the lock, wherein the queue remains unlocked for one or more other aspects of processing of the first transaction, and wherein said second transaction is capable of locking the queue to perform one or more updates of the queue when the queue is unlocked during processing of the first transaction; and
means for maintaining persistence of the persistent messages of said queue, said means for maintaining persistence comprising
means for performing a checkpoint of said queue at predefined time intervals, said means for performing a checkpoint comprising means for copying a definition of said queue and contents of said queue, including said one or more messages, to persistent storage;
means for writing information, between time interval based checkpoints comprising copying said definition of said queue and said contents of said queue, regarding an update of the persistent messages of the queue to a log in persistent storage; and
wherein the means for performing the checkpointing of the queue further comprises means for:
(i) obtaining and locking a checkpoint control record;
(ii) setting a variable "current queue" equal to a local queue;
(iii) determining whether the "current queue" is equal to zero;
(iv) if the "current queue" is equal to zero, then waiting for created processes to finish, and thereafter updating the checkpoint control record to indicate checkpointing is complete, and unlocking the record;
(v) if the "current queue" is not zero, then determining whether the local queue has changed since the last checkpoint;
(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

43. A system of managing message queues, said system comprising:
a transaction to access a queue containing messages resident in volatile memory;
at least one manager used to selectively lock the queue during processing of said transaction, wherein the queue remains unlocked for one or more aspects of the transaction processing; and
wherein the at least one manager maintains persistence of one or more messages of said queue by
performing a checkpoint of said queue at predefined time intervals, said performing the checkpoint comprising copying a definition of said queue and contents of said queue, including said one or more messages, to persistent storage,
between time interval based checkpoints comprising copying said definition of said queue and said contents of said queue, writing information regarding an update of the one or more messages of the queue to a log in persistent storage; and
wherein the performing of the checkpoint of the queue further comprises:
(i) obtaining and locking a checkpoint control record;
(ii) setting a variable "current queue" equal to a local queue;
(iii) determining whether the "current queue" is equal to zero;
(iv) if the "current queue" is equal to zero, then waiting for created processes to finish, and thereafter updating the checkpoint control record to indicate checkpointing is complete, and unlocking the record;
(v) if the "current queue" is not zero, then determining whether the local queue has changed since the last checkpoint;
(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

44. A system of managing message queues, said system comprising:
a plurality of updates to be made in a queue containing messages in volatile memory, and requested as part of a transaction;
a manager used to commit the plurality of updates to the queue under a single lock of the queue, wherein the queue remains unlocked for one or more aspects of processing the transaction;
wherein the manager maintains persistence of one or more messages of the queue by performing a checkpoint of said queue at predefined intervals, said performing the checkpoint comprising copying a definition of said queue and contents of said queue, including said one or more messages, to persistent storage, and between time interval based checkpoints comprising copying said definition of said queue and said contents of said queue, storing information regarding an update of the one or more messages in at least one of a log and one or more checkpoint records; and wherein the performing of the checkpoint of the queue further comprises:
(i) obtaining and locking a checkpoint control record;
(ii) setting a variable "current queue" equal to a local queue;
(iii) determining whether the "current queue" is equal to zero;
(iv) if the "current queue" is equal to zero, then waiting for created processes to finish, and thereafter updating the checkpoint control record to indicate checkpointing is complete, and unlocking the record;
(v) if the "current queue" is not zero, then determining whether the local queue has changed since the last checkpoint;
(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

45. A system of managing message queues, said system comprising:
a first transaction to access a queue containing messages in volatile memory, wherein one or more messages of said queue are persistent messages;
a second transaction to access the queue, wherein at least a part of processing of the second transaction is concurrent with at least a part of processing of the first transaction;
a manager used to obtain a lock of the queue, during an aspect of processing of said first transaction, to commit a plurality of updates to the queue under the lock, wherein the queue remains unlocked for one or more other aspects of processing of the first transaction, and wherein said second transaction is capable of locking the queue to perform one or more updates of the queue when the queue is unlocked during processing of the first transaction; and
wherein the manager maintains persistence of the persistent messages of said queue by
performing a checkpoint of said queue at predefined time intervals, said performing the checkpoint comprising copying a definition of said queue and contents of said queue, including said one or more messages, to persistent storage,
between time interval based checkpoints comprising copying said definition of said queue and said contents of said queue, writing information regarding an update of the persistent messages of the queue to a log in persistent storage; and
wherein the performing of the checkpoint of the queue further comprises:
(i) obtaining and locking a checkpoint control record;
(ii) setting a variable "current queue" equal to a local queue;
(iii) determining whether the "current queue" is equal to zero;
(iv) if the "current queue" is equal to zero, then waiting for created processes to finish, and thereafter updating the checkpoint control record to indicate checkpointing is complete, and unlocking the record;
(v) if the "current queue" is not zero, then determining whether the local queue has changed since the last checkpoint;
(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

46. At least one program storage device readable by a machine, tangibly embodying at least one program of instructions executable by the machine to perform a method of managing message queues, said method comprising:
issuing a transaction to access a queue containing messages resident in volatile memory;
selectively locking the queue during processing of said transaction, wherein the queue remains unlocked for one or more aspects of the transaction processing; and
maintaining persistence of one or more messages of said queue, said maintaining persistence comprising
performing a checkpoint of said queue at predefined time intervals, said performing the checkpoint comprising copying a definition of said queue and contents of said queue, including said one or more messages, to persistent storage;
between time interval based checkpoints comprising copying said definition of said queue and said contents of said queue, writing information regarding an update of the one or more messages of the queue to a log in persistent storage; and
wherein the performing of the checkpoint of the queue further comprises:
(i) obtaining and locking a checkpoint control record;
(ii) setting a variable "current queue" equal to a local queue;
(iii) determining whether the "current queue" is equal to zero;
(iv) if the "current queue" is equal to zero, then waiting for created processes to finish, and thereafter updating the checkpoint control record to indicate checkpointing is complete, and unlocking the record;
(v) if the "current queue" is not zero, then determining whether the local queue has changed since the last checkpoint;
(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

47. The at least one program storage device of claim 46, wherein the selectively locking comprises locking the queue to update the queue.

48. The at least one program storage device of claim 47, wherein said method further comprises unlocking the queue substantially immediately after the update.

49. The at least one program storage device of claim 47, wherein the update comprises changing a status of one or more messages of the queue.

50. The at least one program storage device of claim 49, wherein the status is changed from unavailable to available.

51. The at least one program storage device of claim 47, wherein the update comprises removing a message from the queue.

52. The at least one program storage device of claim 47, wherein the transaction includes a request to place a message on the queue, and wherein the update comprises placing a pointer to the message on the queue.

53. The at least one program storage device of claim 52, wherein the update further comprises marking the message as unavailable.

54. The at least one program storage device of claim 47, wherein the transaction includes a request to retrieve a message from the queue, and wherein the update comprises marking the message as taken.

55. The at least one program storage device of claim 46, wherein the transaction includes a request to retrieve a message from the queue, and the selectively locking comprises:
- one lock of the queue to mark the message as taken; and
- another lock of the queue to remove the message from the queue.

56. The at least one program storage device of claim 46, wherein the transaction includes a request to place a message on the queue, and the selectively locking comprises:
- one lock of the queue to include a pointer to the message on the queue and to mark the message as unavailable; and
- another lock of the queue to change the message from unavailable to available.

57. The at least one program storage device of claim 46, wherein the transaction comprises a plurality of requests to update the queue, and wherein a plurality of updates are committed to the queue under a single lock obtained by the selectively locking.

58. The at least one program storage device of claim 57, wherein the committing of the plurality of updates is controlled by a resource manager.

59. The at least one program storage device of claim 46, wherein said method further comprises concurrently processing a plurality of transactions that are to access the queue.

60. The at least one program storage device of claim 46, wherein said method further comprises processing another transaction that is to access the queue concurrently with the processing of the transaction, wherein the another transaction is able to lock the queue to update the queue when the queue is unlocked during the concurrent processing of the transaction.

61. At least one program storage device readable by a machine, tangibly embodying at least one program of instructions executable by the machine to perform a method of managing message queues, said method comprising:
- requesting as part of a transaction a plurality of updates to a queue containing messages in volatile memory;
- committing the plurality of updates to the queue under a single lock of the queue, wherein the queue remains unlocked for one or more aspects of processing the transaction;
- maintaining persistence of one or more messages of the queue, the maintaining persistence comprising performing a checkpoint of said queue at predefined time intervals, said performing the checkpoint comprising copying a definition of said queue and contents of said queue, including said one or more messages, to persistent storage, and between time interval based checkpoints comprising copying said definition of said queue and said contents of said queue, storing information regarding an update of the one or more messages in at least one of a log and one or more checkpoint records; and wherein the performing of the checkpoint of the queue further comprises:
  (i) obtaining and locking a checkpoint control record;
  (ii) setting a variable "current queue" equal to a local queue;
  (iii) determining whether the "current queue" is equal to zero;
  (iv) if the "current queue" is equal to zero, then waiting for created processes to finish, and thereafter updating the checkpoint control record to indicate checkpointing is complete, and unlocking the record;
  (v) if the "current queue" is not zero, then determining whether the local queue has changed since the last checkpoint;
  (vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

62. The at least one program storage device of claim 61, wherein said method further comprising obtaining said single lock.

63. The at least one program storage device of claim 62, wherein said obtaining and said committing are controlled by a resource manager.

64. The at least one program storage device of claim 61, wherein said requesting comprises issuing at least one of one or more requests to place a message on the queue and one or more requests to retrieve a message from the queue, and wherein the committing comprises at least one of changing a status of one or more PUT messages and removing one or more GET messages.

65. The at least one program storage device of claim 61, wherein said method further comprises concurrently processing a plurality of transactions that are to access the queue, wherein one transaction of said plurality of transactions includes the requesting.

66. An article of manufacture, comprising:
- at least one computer usable medium having computer readable program code means embodied therein for causing the managing of message queues, the computer readable program code means in said article of manufacture comprising:
- computer readable program code means for causing a computer to issue a first transaction to access a queue containing messages in volatile memory, wherein one or more messages of said queue are persistent messages;
- computer readable program code means for causing a computer to issue a second transaction to access the queue, wherein at least a part of processing of the second transaction is concurrent with at least a part of processing of the first transaction;
- computer readable program code means for causing a computer to obtain a lock of the queue, during an aspect of processing of said first transaction, to commit a plurality of updates to the queue under the lock, wherein the queue remains unlocked for one or more other aspects of processing of the first transaction, and wherein said second transaction is capable of locking the queue to perform one or more updates of the queue when the queue is unlocked during processing of the first transaction;

computer readable program code means for causing a computer to maintain persistence of the persistent messages of said queue, said maintaining persistence comprising performing a checkpoint of said queue at predefined time intervals, said performing the checkpoint comprising copying a definition of said queue and contents of said queue, including said one or more messages, to persistent storage; and between time interval based checkpoints comprising copying said definition of said queue and said contents of said queue, writing information regarding an update of the persistent messages of the queue to a log in persistent storage; and wherein the performing of the checkpoint of the queue further comprises:

(i) obtaining and locking a checkpoint control record;

(ii) setting a variable "current queue" equal to a local queue;

(iii) determining whether the "current queue" is equal to zero;

(iv) if the "current queue" is equal to zero, then waiting for created processes to finish, and thereafter updating the checkpoint control record to indicate checkpointing is complete, and unlocking the record;

(v) if the "current queue" is not zero, then determining whether the local queue has changed since the last checkpoint;

(vi) if the local queue has changed, then creating an asynchronous process to checkpoint the local queue, and thereafter, or if the local queue has not changed since the last checkpoint, then setting the variable "current queue" equal to a next local queue and repeating said steps (iii)–(vi) until each local queue has undergone checkpointing.

67. The method of claim 1, wherein the asynchronous process to checkpoint the local queue comprises:

locking the local queue, and copying contents of the local queue to a checkpoint area resident on a storage medium;

unlocking the local queue and informing a checkpoint root process that the local queue has been checkpointed, thereby completing the checkpoint process.

68. The method of claim 67, wherein the transaction comprises:

a first transaction to access the queue, and wherein the method further comprises issuing a second transaction to access the queue, wherein at least a part of processing of the second transaction is concurrent with at least a part of processing of the first transaction; and wherein the selectively locking comprises obtaining a lock of the queue, during an aspect of processing of the first transaction, to commence a plurality of updates to the queue under the lock, wherein the queue remains unlocked for one or more other aspects of processing of the first transaction, and wherein the second transaction locks the queue to perform one or more updates of the queue when the queue is unlocked during processing of the first transaction.

69. The method of claim 68, wherein the selectively locking comprises locking the queue during processing of the first transaction and the second transaction only when the queue is to be updated, thereby minimizing locking of the queue.

* * * * *